United States Patent
Kim et al.

(10) Patent No.: US 12,373,555 B2
(45) Date of Patent: Jul. 29, 2025

(54) SYSTEM AND METHOD OF DETECTING ABNORMAL ACT THREATENING TO SECURITY BASED ON ARTIFICIAL INTELLIGENCE

(71) Applicant: Korea Internet & Security Agency, Naju-si (KR)

(72) Inventors: Do Won Kim, Naju-si (KR); Tae Eun Kim, Naju-si (KR); Ki Jong Son, Naju-si (KR); Seul Ki Choi, Naju-si (KR); Jong Ki Kim, Naju-si (KR)

(73) Assignee: Korea Internet & Security Agency, Naju-si (KR)

( * ) Notice: Subject to any disclaimer, the term of this patent is extended or adjusted under 35 U.S.C. 154(b) by 240 days.

(21) Appl. No.: 17/972,655

(22) Filed: Oct. 25, 2022

(65) Prior Publication Data
US 2023/0146636 A1    May 11, 2023

(30) Foreign Application Priority Data
Nov. 10, 2021  (KR) .................. 10-2021-0153916

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/034* (2013.01)

(58) Field of Classification Search
None
See application file for complete search history.

(56) References Cited

U.S. PATENT DOCUMENTS

| 11,509,674 B1* | 11/2022 | Beauchesne | ........ H04L 63/1425 |
| 2017/0237752 A1* | 8/2017 | Ganguly | ............ H04L 63/1416 726/25 |
| 2018/0367551 A1* | 12/2018 | Muddu | ............. G06F 16/24578 |
| 2020/0349467 A1* | 11/2020 | Teague | .................. G06F 16/278 |

(Continued)

FOREIGN PATENT DOCUMENTS

| JP | 2017-530435 A | 10/2017 |
| KR | 10-2020-0057903 A | 5/2020 |

(Continued)

OTHER PUBLICATIONS

Das et al. "Network Intrusion Detection using Natural Language Processing and Ensemble Machine Learning," 2020 IEEE Symposium Series on Computational Intelligence (SSCI), pp. 829-835, DOI: 10.1109/SSCI47803.2020.9308268 (Year: 2020).*

(Continued)

*Primary Examiner* — Philip J Chea
*Assistant Examiner* — Bin Qing Zheng
(74) *Attorney, Agent, or Firm* — Revolution IP, PLLC

(57) ABSTRACT

Disclosed is a system and a method of detecting an abnormal act threatening to security based on artificial intelligence according to the present invention, and, more particularly, a system and a method of detecting an abnormal act threatening to security based on artificial intelligence that are capable of rapidly carrying out pre-processing of a large-scaled data set based on multi processing, and efficiently detecting the abnormal act threatening to security via various pieces of security device on the basis of studied artificial intelligence.

12 Claims, 8 Drawing Sheets

(56) References Cited

U.S. PATENT DOCUMENTS

2020/0394478 A1* 12/2020 Malak ................ G06V 30/2272
2021/0200749 A1* 7/2021 Sghiouer ............... G06F 16/215

FOREIGN PATENT DOCUMENTS

| KR | 20200057903 A | * | 5/2020 | ............. G06N 20/00 |
| KR | 10-2021-0055560 A | | 5/2021 | |
| KR | 20210055560 A | * | 5/2021 | ............. G06N 20/00 |
| KR | 10-2281819 B1 | | 7/2021 | |
| WO | WO-2016004075 A1 | * | 1/2016 | ........... G06F 9/5066 |

OTHER PUBLICATIONS

Office Action of Korea Patent Application No. 10-2021-0153916 mailed May 3, 2022.

* cited by examiner

FIG. 7

| NAME OF FIELD (ENG) | NAME OF FIELD (KOR) | DESCRIPTION | CANDIDATE FEATURE |
|---|---|---|---|
| DetectStartTime | TIME AT WHICH DETECTION STARTS | TIME AT WHICH AN ATTACK IS DETECTED | ○ |
| SrcIP | IP OF A STARTING PLACE | IP ADDRESS OF AN ATTACKER | ○ |
| DstIP | IP OF A DESTINATION | IP (SIGNED INT 32BIT, DECIMAL NUMBER) OF A VICTIM (DESTINATION) | ○ |
| DstPort | PORT OF A DESTINATION | PORT OF A VICTIM (DESTINATION) | ○ |
| DirectionType | PACKET DIRECTION | ATTACK DIRECTION AIMED AT A SECURITY CONTROL TARGET AGENCY (INBOUND, OUTBOUND) | ○ |
| PROTOCOL | PROTOCOL | COMMUNICATIONS PROTOCOL (ICMP:01, TCP:06, UDP:17) | ○ |
| EventType | EVENT TYPE | SECURITY EVENT TYPES FOR GROUPING ATTACK TYPES (WEB ATTACKS, ATTEMPT TO APPROACH BY AN UNAUTHORIZED PERSON, AND SO ON) | INFORMATION FOR DATA CLASSIFICATION |
| DetectName | NAME OF DETECTION | NAME OF DETECTION / NAME OF DETECTION RULES / ATTACK TYPE COLUMN | INFORMATION FOR DATA CLASSIFICATION |
| PacketSize | SIZE OF A PACKET | SIZE OF A PACKET(byte) | ○ |
| LABEL | LABELING | INFORMATION ON LABELING (CORRECTION DETECTION AND WRONG DETECTION) | INFORMATION FOR DATA CLASSIFICATION |
| PAYLOAD | PAYLOAD | DATA INTO WHICH INFORMATION ABOUT ATTACK CHARACTER STRING AND DETECTION RULES IS INSERTED | ○ |

SYSTEM AND METHOD OF DETECTING ABNORMAL ACT THREATENING TO SECURITY BASED ON ARTIFICIAL INTELLIGENCE

CROSS-REFERENCE TO RELATED APPLICATION

This application claims priority to Korean Patent Application No. 10-2021-0153916, filed on Nov. 10, 2021, in the Korean Intellectual Property Office, the entire contents of which are hereby incorporated by reference.

BACKGROUND OF THE INVENTION

Field of the Invention

The present invention relates to a system and a method of detecting an abnormal act threatening to security based on artificial intelligence, and, more particularly, a system and a method of detecting an abnormal act threatening to security based on artificial intelligence, which are capable of efficiently detecting the abnormal act threatening to security through various kinds of security device based on artificial intelligence studied.

Description of the Related Arts

Under enterprise circumstances, threat detection solution and intrusion prevention system having various functions intended for taking precautions against various threats to security have been introduced.

Examples of this threat detection include enterprise security management (ESM), security information & event management (SIEM), machine learning (ML) solution, and so on, and examples of the intrusion prevention system include an intrusion prevention system named a firewall, a web application firewall (WAF), instruction protection system (IPS), and so on.

Although the security information & event management (SIEM) equipment which performs connection analysis by collecting events of these kinds of security device shows excellent performance, in order to judge and sort really threatening attack events among many events, experts' knowledge and experiences in each field, and a lot of time for analysis work are required. Due to this, although monitoring is successively carried out, an intrusion cannot be prevent rapidly, or a manager can fail to monitor it, and thus can fail to take appropriate measures, according to an increase in threats to security by intellectual cyber attacks, events to be analyzed has increased rapidly, and therefore there has been a limit to the management of security control based on human efforts. Security control based on human efforts and experiences (ability) can necessarily occur many differences in analysis levels, and because a confrontation for security management becomes weakened in an unprotected time zone, it has been required for efficient security management to develop a technology for detecting a threat to security which is automated and is uniform based on artificial intelligence.

Furthermore, because a data format of security events may become different according to each vendor of security device and each control center, in order to cause artificial intelligence learning to be realized in each different circumstances, a technology of supporting expandability for normalizing and standardizing data has been required.

PRIOR ART DOCUMENT

Patent Document

Korean Patent Registration No. 10-2281819 registered on Jul. 20, 2021, entitled "AUTOENCODER ENSEMBLE BASED ABNORMAL BEHAVIOR DETECTION METHOD AND SYSTEM"

SUMMARY OF THE INVENTION

The present invention has been devised due to the necessity as described above, and an object of the present invention is to provide a system and a method of detecting an abnormal act threatening to security based on artificial intelligence, which can efficiently detect an abnormal act threatening to security, actually threatening to assets to be protected by studying a security event data set generated by security device based on artificial intelligence.

In order to achieve the object, a system of detecting an abnormal act threatening to security based on artificial intelligence according to the present invention may comprise: a data collection device configured to collected data required for learning of an artificial intelligence model, to normalize and classify an event field and a format of the collected data, thereby generating a standardized data set; a pre-processing device configured to extract data concerning features from the standardized data set generated by the data collection device, and to generate a learning data set, a verification data set, and a test data set by rapidly performing pre-processing based on multi-processing for natural language processing and so on required for artificial intelligence learning based on a text; an abnormal-act detection device configured to receive the learning data set, the verification data set, and the test data set transmitted from the date pre-processing device in order to cause the artificial intelligence model to study, and to detect an abnormal act based on data threatening to security collected from security device using the artificial intelligence model.

According to a preferable exemplary embodiment of the present invention, the data collection device may comprise: a format transform unit configured to transform the data collected from the security device into a comma-separated values (CSV) format; a data normalization unit configured to select candidate feature fields by normalizing the data transformed by the format transform unit into a unit in an individual field on the basis of a pre-defined divider; and a data classification unit configured to classify the data normalized by the data normalization unit learning data, into each group defined in a classification system table, and to generate a data set of the data with any one group of a learning group, a verification group, and a test group.

According to another preferable exemplary embodiment, the plurality of candidate feature fields may comprise any one or more pieces of information among time at which detection starts, an address of a starting place, an address of a destination, a port of a destination, a packing direction, a protocol, a type of an event, the name of detection, a length of a packet, labeling, and a payload.

According to another preferable exemplary embodiment, the date pre-processing device may comprise: a data processing unit configured to carry out decoding from the standardized data set transmitted and received from the data collection device, removal of unnecessary data, normalization of a payload, and so on; a feature information transform unit configured to transform a feature value larger than a reference value voluntarily fixed in a data scope by receiving the data from the data processing part, thereby adjusting data scaling; and a natural language learning unit configured to express feature information pre-processed by the data processing unit and feature information transform unit as a vector, and to generate a learning data set, a verification data set, a test data set by causing the artificial intelligence model to previously study front and back words of the vectorized data, and text information.

According to another preferable exemplary embodiment, the abnormal-act detection device may comprise: an artificial intelligence model learning unit configured to carry out learning of the plurality of artificial intelligence models via the learning data set generated by the data pre-processing device, and to select an artificial intelligence model having the highest performance among the plurality of artificial intelligence models; an artificial intelligence model selection unit configured to select any one among the artificial intelligence models saved in the artificial intelligence model learning unit when the data threatening to security from the security device is collected; an artificial intelligence model estimate unit configured to generate information on an estimated result by automatically judging whether the data threatening to security is correctly detected or is wrongly detected, and to inform a user of information on an abnormal act threatening to security really in case that the data is correctly detected; and a history management unit configured to save the information on the estimated result generated by the artificial intelligence model estimate part, and to transmit the information on the estimated result to the artificial intelligence learning unit when re-learning is performed.

According to another preferable exemplary embodiment, the artificial intelligence model learning unit may select and save the artificial intelligence model having the highest performance by measuring respective AUC (Area under the ROC curve) marks of the plurality of artificial intelligence models using a Bayesian optimizer technique of optimizing hyperparameters of the artificial intelligence models.

According to another preferable exemplary embodiment, a method of detecting an abnormal act threatening to security based on artificial intelligence, which uses the system of detecting an abnormal act threatening to security based on artificial intelligence, may comprise: step A in which a data collection device collects data required for learning of artificial intelligence models from security device, and generates a standardized data set by normalizing and classifying an event field and a format of the collected data; step B in which a data pre-processing device extracts feature data from the standardized data set generated by the data collection device, and generates a learning data set, a verification data set, and a test data set by rapidly carrying out data pre-processing based on multi processing for natural language processing, and so on required for artificial intelligence learning based on a text; and step C in which an abnormal-act detection device causes artificial intelligence models to study by receiving the processed data set from the data pre-processing device, and detects an abnormal act based on data threatening to security collected from security device.

According to another preferable exemplary embodiment, said step A may comprise: a step in which a format transform unit transforms the data collected from the security device into a comma-separated values (CSV) format; a step in which a data normalization unit normalizes the data transformed by the format transform unit into an individual field unit based on a pre-defined divider, and select candidate feature fields; and a step in which a data classification unit classifies the data normalized by the data normalization part, learning data, into each group defined in a classification system table, and generates a data set by classifying the data into any one group among a learning group, a verification group, and a test group.

According to another preferable exemplary embodiment, the plurality of candidate feature fields comprise any one or more pieces of information among various pieces of information on time at which detection starts, an address of a starting place, an address of a destination, a port of a destination, a packing direction, a protocol, a type of an event, a name of detection, a length of a packet, labeling, and a payload.

According to another preferable exemplary embodiment, said step B may comprise: a step in which a data processing unit carries out decoding, removal of unnecessary data, normalization of a payload, and so on; a step in which a feature information transform unit receives the data transmitted from the data processing part, and transforms a feature value larger than a voluntarily fixed reference value in a data scope into a previously defined value, thereby adjusting data scaling; and a step in which a natural language learning unit expresses information on a feature pre-processed by the feature information transform unit as a vector, and generates a learning data set, a verification data set, and a test data set by causing information on front and back words of the vectorized data, and a context to be studied previously.

According to another preferable exemplary embodiment, said step C may comprise: a step in which an artificial intelligence model learning unit carries out learning of a plurality of artificial intelligence models via the learning data set generated by the data pre-processing device, and selects an artificial intelligence model having the highest performance among the plurality of artificial intelligence models; a step in which an artificial intelligence model selection unit selects any one among the artificial intelligence models saved in the artificial intelligence model learning unit when the data threatening to security is collected; a step in which an artificial intelligence model estimate unit generates information on an estimated result by judging whether or not the data threatening to security is correctly detected or is wrongly detected, and informs a user of information on an abnormal act actually threatening to security in case that detection is correctly performed; and a step in which a history management unit saves the information on the estimated result generated by the artificial intelligence model estimate part, and transmit the information on the estimated result to the artificial intelligence learning unit when re-learning is performed.

According to the other preferable exemplary embodiment, the artificial intelligence model learning unit may select and save the artificial intelligence model having the highest performance by measuring area under the ROC curve (AUC) marks of the plurality of artificial intelligence models using a Bayesian optimizer technique of optimizing hyperparameters of the artificial intelligence models.

The system and the method of detecting an abnormal act threatening to security based on artificial intelligence according to the present invention according to the present invention are effective to rapidly pre-process a large-scale data set through a data pre-processing technology based on multi processing, to normalize security equipment's various piece of data through a low data format of security events, and to efficiently detect an abnormal act threatening to security, threatening to equipment to be protected actually by learning based on artificial intelligence.

BRIEF DESCRIPTION OF THE DRAWINGS

FIG. 7 is an exemplary view showing individual fields according to another exemplary embodiment of the present invention.

DETAILED DESCRIPTION OF THE INVENTION

Figure 1:
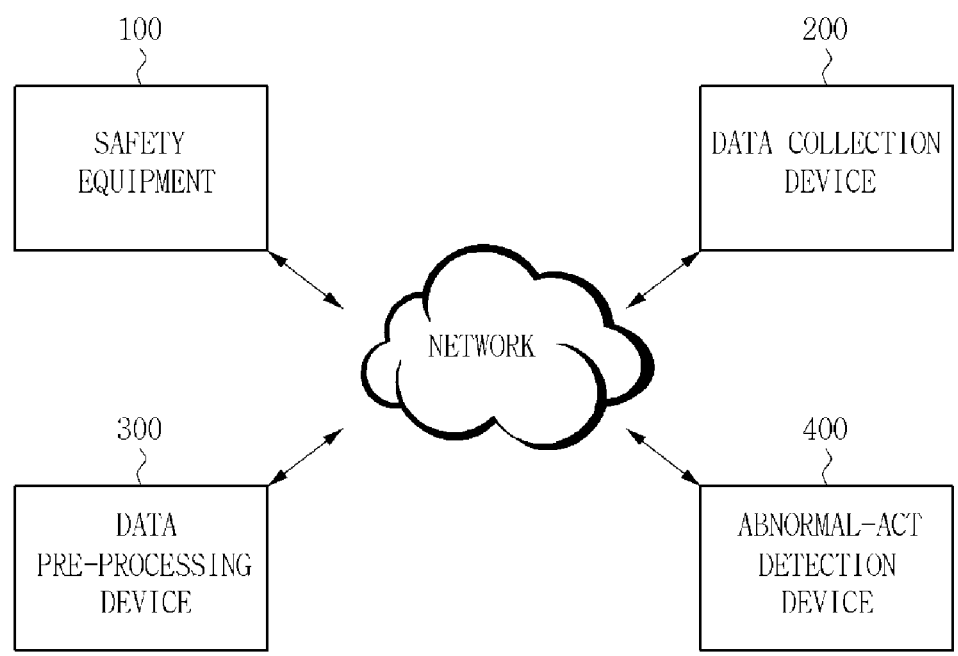
FIG. 1 is a block diagram showing an abnormal-act detection system according to one exemplary embodiment of the present invention.

Hereinafter, preferable exemplary embodiments of the present invention will be described in detail with reference to the accompanying drawings. The advantages and distinguishing characteristics of the present invention, and methods leading thereto will be clear on the basis of exemplary embodiments described in detail below as well as the accompanying drawings. However, the present invention should not be limited to the exemplary embodiments disclosed below, but can be embodied in various forms which are different from one another, and these exemplary embodiments are only provided for causing disclosure of the present invention to become complete, and for completely informing those having ordinary skill in the technical field to which the present invention pertains of the scope of the invention, and the present invention is only defined by the scoped of the claims. The same reference numerals throughout the specification indicate the same constituent elements.

Unless the definitions are indicated otherwise, all the terms (including technical and scientific terms) used in the present specification can be used in the meanings which can be commonly understood to those having ordinary skill in the technical field. Also, terms generally used and defined in a dictionary should not be ideally and excessively interpreted, unless they are specially defined. The terms used herein are intended to explain the exemplary embodiments, and are not intended to limit the present invention. In the present specification, the singular forms are intended to include the plural forms as well, unless the context clearly indicates otherwise. Hereinafter, some exemplary embodiments of the present invention is described with reference to the drawings.

Figure 2:
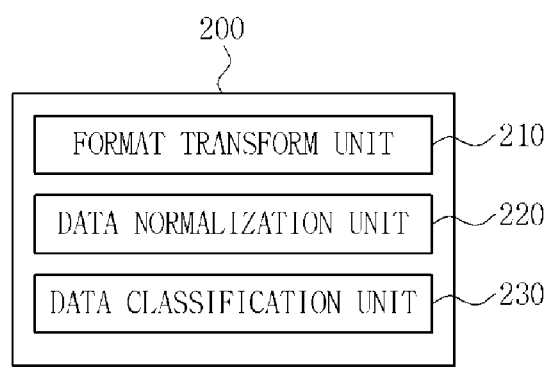
FIG. 2 is a block diagram showing a data collection device according to one exemplary embodiment of the present invention.
Figure 3:
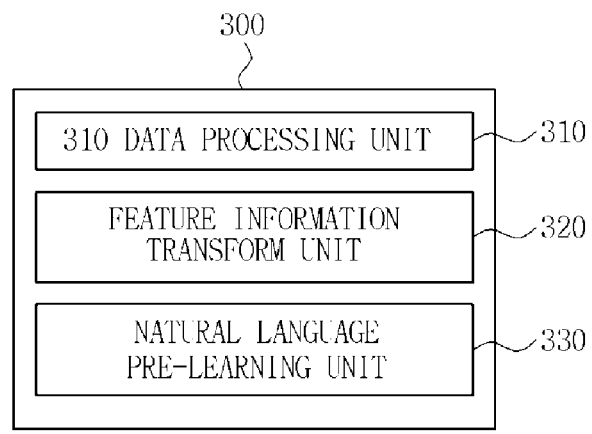
FIG. 3 is a block diagram showing a data pre-processing device according to one exemplary embodiment of the present invention.
Figure 4:
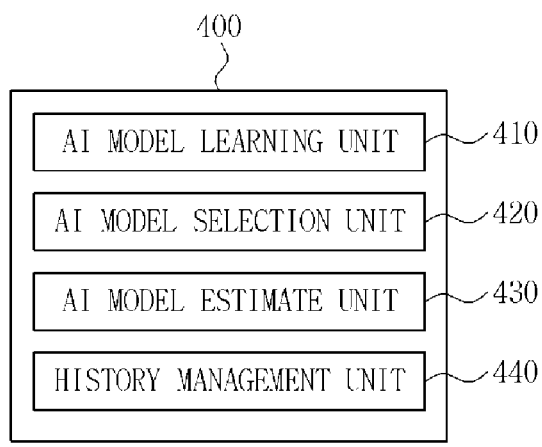
FIG. 4 is a block diagram showing an abnormal-act detection device according to one exemplary embodiment of the present invention.

FIG. 1 is a block diagram showing an abnormal-act detection system according to one exemplary embodiment of the present invention, FIG. 2 is a block diagram showing a data collection device according to one exemplary embodiment of the present invention, FIG. 3 is a block diagram showing a data pre-processing device according to one exemplary embodiment of the present invention, and FIG. 4 is a block diagram showing an abnormal-act detection device according to one exemplary embodiment of the present invention.

As illustrated in FIG. 1 to FIG. 4, a system of detecting an abnormal act according to the present invention may comprise: security device 100; a data collection device 200; a data pre-processing device 300; and an abnormal-act detection device 400.

The data collection device 200 may collect data required for the learning of an artificial intelligence model from the security device 100, and may generate a data set standardized by normalizing and classifying an event field and a format of the collected data.

The data pre-processing device 300 may extract data concerning features from the standardized data set generated by the data collection device 200, and may rapidly carry out data pre-processing based on multi-processing with respect to natural language processing and so on required for artificial intelligence's learning based on a text, thereby generating a learning data set, a verification data set, and a test data set.

The abnormal-act detection device 400 may cause the artificial intelligence models to study by receiving the learning data set, the verification data set, and the test data set transmitted from the data pre-processing device 300, and may detect an abnormal act from threatening data to security collected from the security device using the artificial intelligence models.

First, an enterprise security management (ESM) system, a security information & event management (SIEM) system, an intrusion detection system (IDS), a machine learning solution, or the like may be used in the security device 100, but are not intended to limit the security device, and more various kinds of security device can be applied.

Here, the ESM system is an integrated security management system of collecting the logs and events of security solutions such as a firewall, an instruction protection system (an intrusion detection system, IDS), a unified threat management (UTM) system, and so on to become one, and may carry out functions of integrally managing the integrated solutions, causing the solutions to be linked with one another, and so on.

The SIEM system is a system in which the SIM and the SEM are combined with each other, has a form developed from the ESM system, and is an integrated security management solution which previously prevent a threat through analysis on a correlation based on big data by collecting logs and events generated in various scope such as various kinds of sever devices, network device, applications, and so on.

The data collection device 20 may receive data threatening to security including an event log using a method such as a system log, a simple network management protocol (SNMP) trap, and so on from at least one among said various kinds of security device The data collection device 200 may comprise: a format transform unit 210; a data normalization unit 220; and a data classification unit 230.

The format transform unit 210 may transform the data collected from the security device into a unified comma-separated values (CSV) format.

The data normalization unit 220 may normalize the transformed data into the unit of individual fields based on a pre-defined divider, thereby selecting a candidate feature field.

The data classification unit 230 may classify the data normalized by the data normalization part, learning data, into each group defined in a classification system table, and may generate a data set in which the data is again standardized into any one group among a learning group, a verification group, and a test group.

The data pre-processing device 300 may comprise: a data processing unit 310; a feature information transform unit 320; and a natural language pre-learning unit 330.

The data processing unit 310 may carry out decoding, the removal of unnecessary data, normalization of a payload, and so on with respect to the standardized data set transmitted and received from the data collection device 200.

The feature information transform unit 320 may receive data transmitted from the data processing unit and transform a larger feature value than a voluntarily fixed standard value in a scope of the data scope into a previously defined value, thereby adjusting data scaling.

The natural language pre-learning unit 330 may express feature information, which is pre-processed by the data processing unit 310 and the feature information transform unit 320, as a vector, and may generate a learning data set, a verification data set, and a test data set by causing the artificial intelligence models to previously make a study of front and back words of the data expressed as the vector, and text information.

The abnormal-act detection device 400 may comprise: an artificial intelligence model learning unit 410; an artificial intelligence model selection unit 420; an artificial intelligence model estimate unit 430; and a career management unit 440.

The artificial intelligence model learning unit 410 may cause a plurality of artificial intelligence models to make a study through the learning data set generated by the data pre-processing device 300, and may select an artificial intelligence model having the highest performance among the plurality of artificial intelligence models through the verification and test data sets, thereby saving information thereon.

The artificial intelligence model selection unit 420 may select any one among the artificial intelligence models saved in the artificial intelligence model learning unit 410 when threatening data to security is collected from the security device 100.

The artificial intelligence model estimate unit 430 may generate information on an estimated result by automatically judging whether the data threatening to security is correctly detected or is wrongly detected through the model selected by the artificial model selection unit 420, and may inform a user of information on a really threatening abnormal act when detection is correctly performed.

The history management unit 440 may save estimated result information which the artificial intelligence model estimate unit 430 generates, and may transmit the estimated result information to the artificial intelligence model learning unit 410 when learning is again carried out.

Hereinafter, a method of detecting an abnormal act used through the system of detecting an abnormal act threatening to security based on artificial intelligence according to, which is configured as above, is described based on FIG. 5 to FIG. 10.

Figure 5:
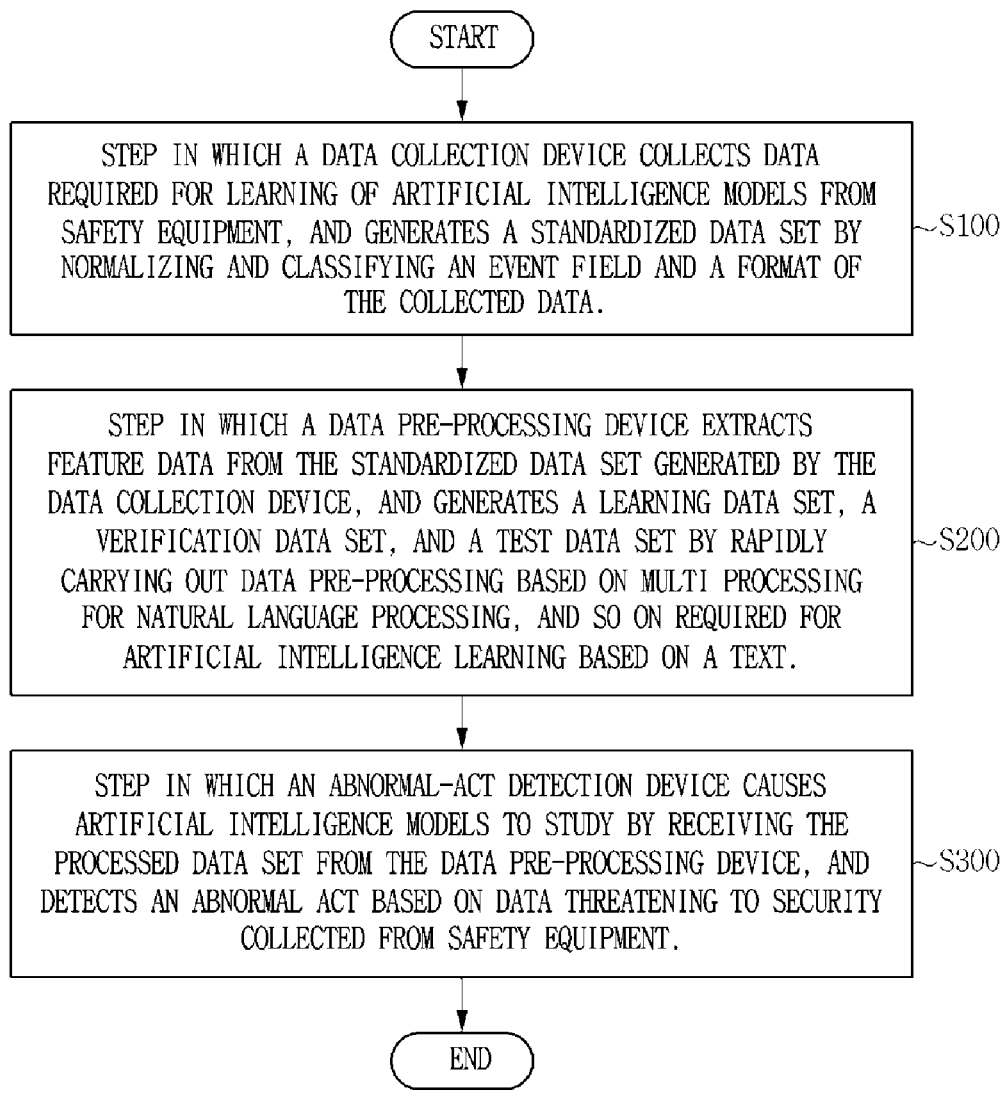
FIG. 5 is a flow chart showing a method of detecting an abnormal act using the abnormal-act detection system according to another exemplary embodiment of the present invention.

FIG. 5 is a flow chart having an abnormal-act detection method used through the abnormal-act detection system according to one exemplary embodiment of the present invention.

As illustrated in FIG. 5, the abnormal-act detection method used through the abnormal-act detection system according to the present invention comprises: a step S100 in which a data collection device 200 collects data required for the learning of artificial intelligence models from security device 100, and generates a standardized data set by normalizing and classifying an event field and a format of the collected data; a step S200 in which a data pre-processing device 300 generates a learning data set, a verification data set, and a test data set by extracting feature data from the standardized data set which the data collection device 200 generates, and rapidly carrying out data pre-processing based on multi-processing with respect to natural language processing required for the study of artificial intelligence based on a text; and a step S300 in which the abnormal-act detection device 400 causes artificial intelligence models to study by receiving the data set processed from the data pre-processing device 300, and detects an abnormal act from the data threatening to security collected from the security device.

Figure 6:
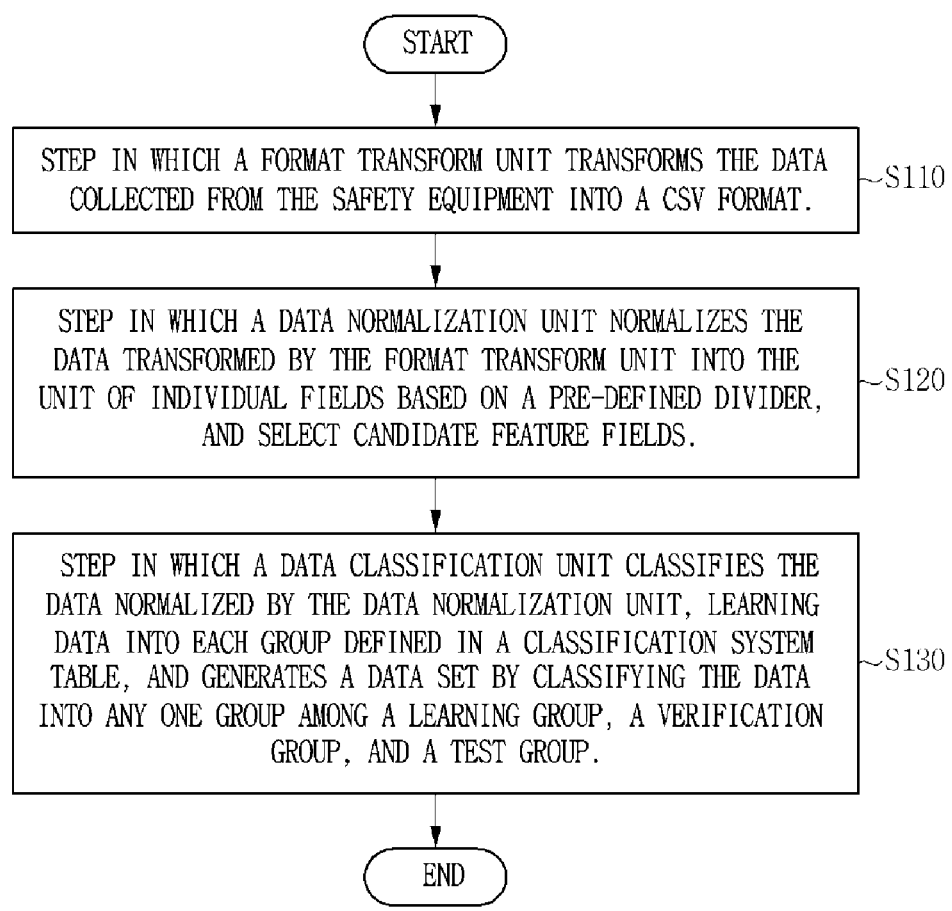
FIG. 6 is a flow chart showing a method of collecting data using the data collection device according to another exemplary embodiment of the present invention.

Here, more particularly explaining the step S100, it is the same as shown in FIG. 6. FIG. 6 is a flow chart showing a data collection method of a data collection device according to another exemplary embodiment of the present invention.

As illustrated in FIG. 6, the step S100 comprises: a step S110 in which a format transformation unit 210 transforms the data collected from the security device 100 into a unified CSV format; a step S120 in which the data normalization unit normalizes the data transformed by the format transformation unit 210 in the unit of individual fields based on a previously defined divider, and selects a candidate feature field; and a step S130 in which the data classification unit 230 classifies the data normalized by the data normalization unit 220 into each group defined in the classification system table, and generates a data set by re-classifying the data into any one group among a learning group, a verification group, a test group.

At this time, in the step S110, a reason why the format transformation unit 210 transforms the data collected from the security device 100 into the CSV format is for standardizing file formats of collected original data in the CSV format because they are not unified as shown through TXT, XLS, TSV, and so on.

Moreover, in the step S120, the plurality of candidate feature fields may comprise any one or more pieces of information among various pieces of information on time at which detection starts, an address of a starting place, an address of a destination, a port of a destination, a packing direction, a protocol, a type of an event, the name of detection, a length of a packet, labeling, and a payload as shown in FIG. 7. FIG. 7 is an exemplary view showing individual fields according to another exemplary embodiment of the present invention.

Figure 8:
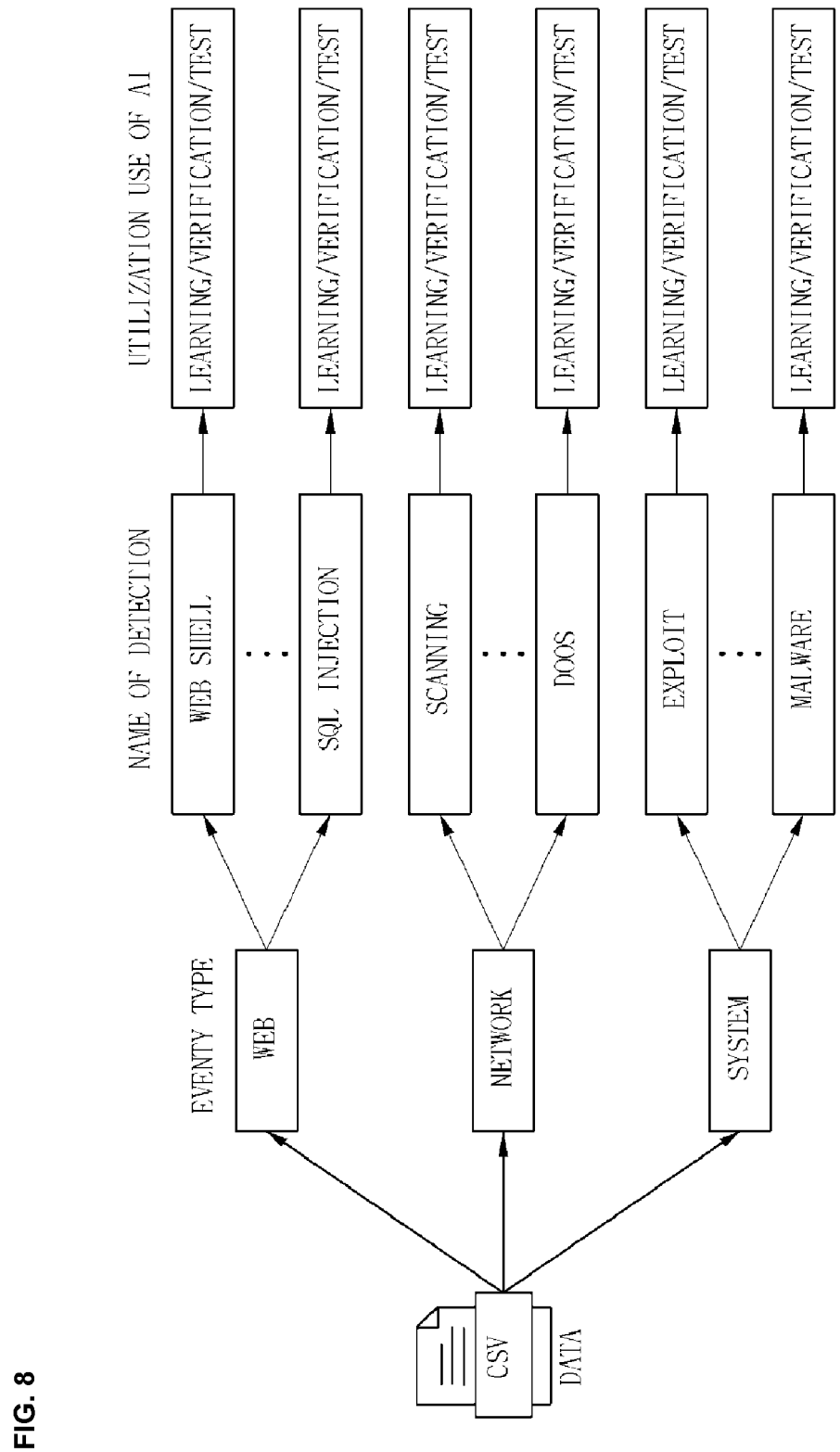
FIG. 8 is an exemplary view showing the classification of data according to another exemplary embodiment of the present invention

Moreover, in the step S130, the data classification unit classifies learning data according to each group defined in the classification system table and generates a data set by classifying the data into any one group among a learning group, a verification group, a test group as shown in FIG. 8.

FIG. 8 is an exemplary view showing the classification of the data according to another exemplary embodiment of the present invention.

Figure 9:
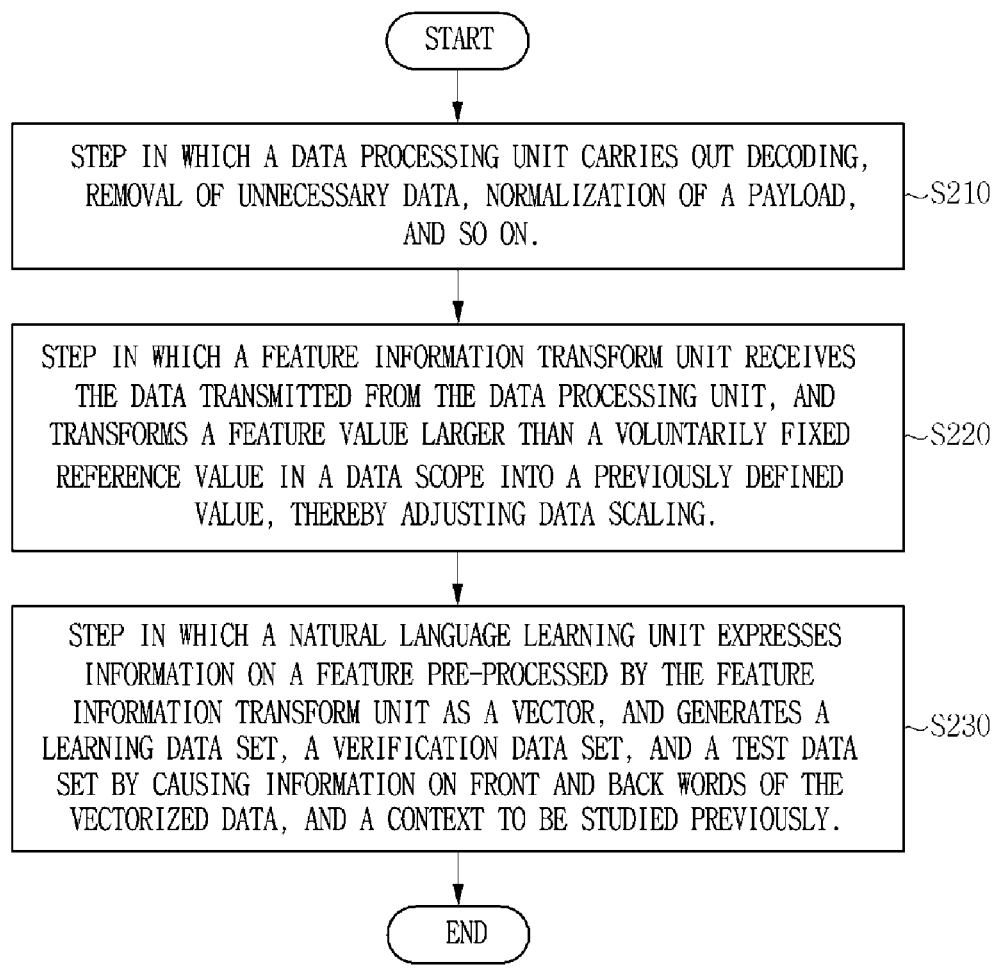
FIG. 9 is a flow chart showing a data pre-processing method through the data pre-processing device according to another exemplary embodiment of the present invention.

Next, the step S200 is described in more detail as shown in FIG. 9.

FIG. 9 is a flow chart showing data pre-processing of the data pre-processing device according to another exemplary embodiment of the present invention.

As illustrated in FIG. 9, the step S200 consists of: a step S210 in which the data processing unit 310 carries out decoding, the removal of unnecessary data, normalization of payload, and so on; a step 220 in which the feature information transformation unit 320 receives the data transmitted from the data processing unit 310 and transforms a larger feature value than a voluntarily fixed standard value in the scope of the data into a previously defined value, thereby adjusting data scaling; and a step S230 in which a natural language pre-learning unit 330 expresses feature information previously processed by the data processing unit 310 and the feature information transformation unit 320 as a vector, and generates the learning data set, the verification data set, and the test data set by previously studying the front and back words of the data expressed as the vector, and the text information.

Figure 10:
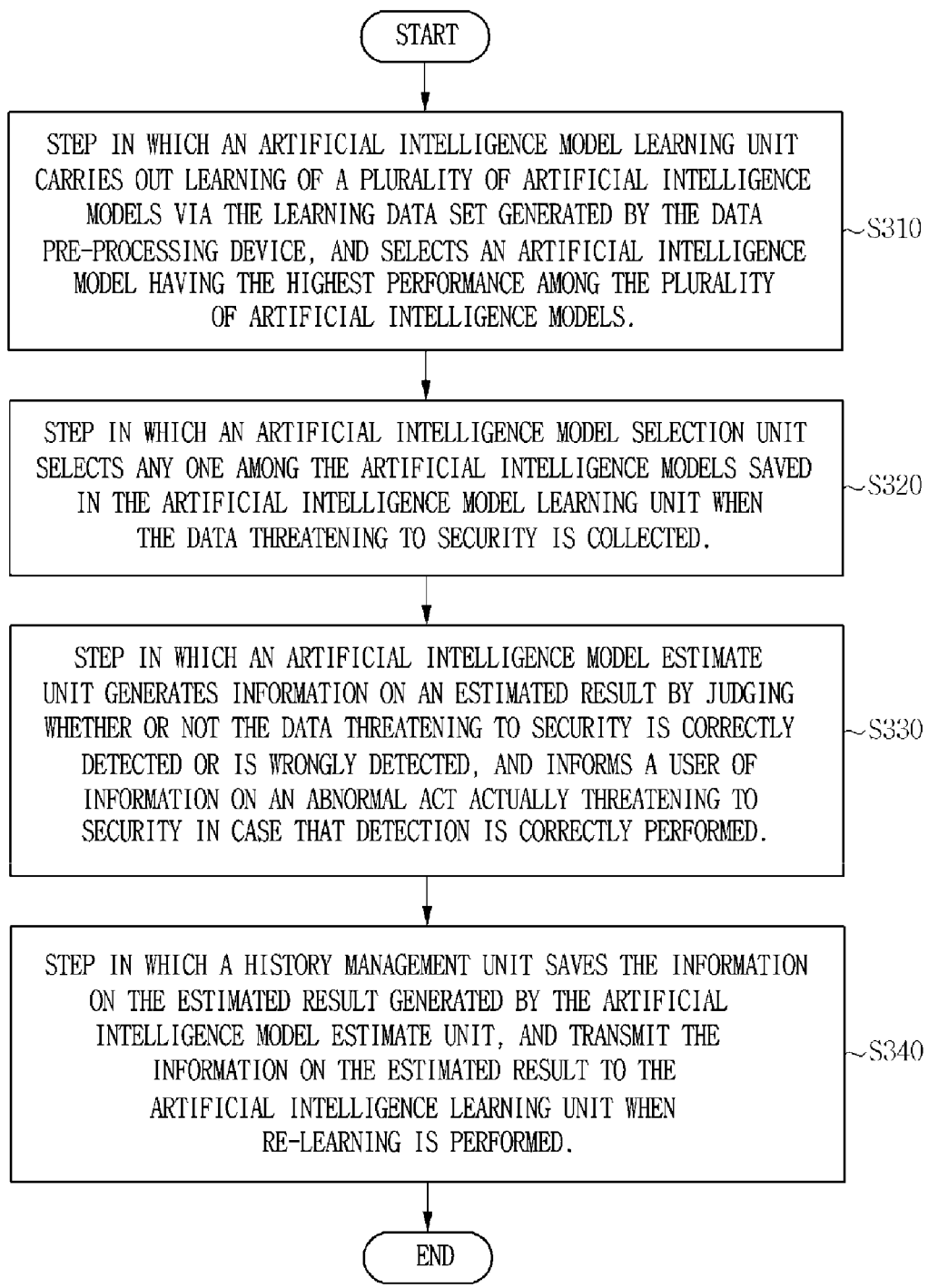
FIG. 10 is a flow chart showing abnormal act detection by the abnormal-act collection device according to the other exemplary embodiment of the present invention.

Last, the step S300 is described in more detail as shown in FIG. 10.

FIG. 10 is a flow chart showing detection of an abnormal act performed by the abnormal detection device according to the other exemplary embodiment of the present invention.

As illustrated in FIG. 10, the step S300 consists of: a step S310 in which the artificial intelligence model learning unit 410 causes the plurality of artificial intelligence models to study via the learning data set which the data pre-processing unit 300 generates, and selects and saves an artificial intelligence model having the highest performance among the plurality of artificial intelligence models via the verification and test data sets; a step S320 in which the artificial intelligence selection unit 420 selects any one among the artificial intelligence models saved in the artificial intelligence model learning unit 410 when the data threatening to security is collected from the security device 100; a step S330 in which the artificial intelligence model estimate unit 430 generates information on an estimated result by automatically judging whether data threatening to security are correctly detected or are wrongly detected through the model which the artificial intelligence model selection unit 420 selects, and informs a user of the information on an abnormal act actually threatening to security in case that detection is correctly performed; and a step S340 in which the career management unit 440 saves the information on the estimated result which the artificial intelligence model estimate unit 430 generates, and transmits the estimated result information to the artificial intelligence model learning unit 410 when a re-study is performed.

At this time, in the step S310, the artificial intelligence model learning unit may value performance of the artificial intelligence models by a different appropriate method rather than a method exemplified when the artificial intelligence model having the highest performance is selected by measurement of respective AUC (Area under the ROC curve) marks of the plurality of artificial intelligence models using a Bayesian optimizer technique of optimizing hyperparameters of the artificial intelligence models.

Moreover, the estimated result information generated in the steps S330 and S340 may be utilized when the artificial intelligence model learning unit 410 causes the artificial intelligence models to re-study so that performance of the artificial intelligence models can be improved, and preferably, the career management unit 440 may inform a user (security controller) of information on an abnormal act actually threatening to security only when the data threatening to security among various pieces of the estimate result information are judged to be correctly detected.

Accordingly, as described above, the artificial intelligence-system and method of detecting an abnormal act threatening to security according to the present invention may rapidly carry out pre-processing of a large-scaled event set in big data scale based on multi-processing, and various kinds of security device may detect an abnormal act threatening to security based on studied artificial intelligence, so it is effective to solve the existing problems.

The security device 100, the data collection device 200, the data pre-processing device 300, and the abnormal-act detection device 400, which carry out the artificial intelligence-method of detecting an abnormal act threatening to security according to the present invention as described above, may be embodied with a computing system.

The computing system may comprise at least one processor connected via a bus, a memory, a user interface input device, a user interface output device, and a storage and network interface.

The processor may be a central processing unit (CPU) or a semiconductor device of executing processing of order words saved in a memory and/or a storage. The memory and the storage may comprise various kinds of volatile or non-volatile storage media. For example, the memory may comprise a read-only memory 631 (ROM), and a random-access memory (RAM).

Accordingly, the method or the step of algorithm described with the exemplary embodiments disclosed in the description herein may be directly embodied by hardware executed by the processor, a software module, or a combination thereof. The software module may reside in a storage medium (i.e., a memory and/or a storage), such as an RAM memory, a flash memory, an ROM memory, an erasable programmable read-only memory (EPROM), an electrically erasable programmable read-only memory (EEPROM), a register, a hard disk, an attachable or detachable disk, a compact disk read-only memory. The exemplary storage medium may be coupled to the processor, and the processor may decode information from the storage media and may register the information in the storage medium. On the other hand, the storage medium may be in a form of being integrated with the processor. The processor and the storage medium may reside within an application-specific integrated circuit (ASIC). The ASIC may reside within a user terminal. On the other hand, the processor and storage medium may reside as separate components within the user terminal.

As described above, although the exemplary embodiments of the present invention are described with reference to the accompanying drawings, those having ordinary skill in the technical field to which the present invention pertains can understand that the present invention may be embodied into other specific forms without modification to its technical ideas or necessary distinguishing characteristics. Therefore, the exemplary embodiments described above should be understood to be exemplary of the present invention and should not be understood to limit the present invention in all the aspects.

What is claimed is:

1. A system of detecting an abnormal act threatening to security based on artificial intelligence, the system comprising:

a data collection device configured to collect data required for learning of an artificial intelligence model, and to normalize and classify an event field and a format of the collected data, thereby generating a standardized data set;

a data pre-processing device configured to extract data concerning features from the standardized data set generated by the data collection device, and to generate a learning data set, a verification data set, and a test data set by rapidly performing pre-processing based on multi-processing for natural language processing required for artificial intelligence learning based on a text; and an abnormal-act detection device configured to receive the learning data set, the verification data set, and the test data set transmitted from the data pre-processing device in order to cause the artificial intelligence model to study, and to detect an abnormal act based on data threatening to security collected from a security device using the artificial intelligence model, wherein the data collection device includes:

a format transform unit configured to transform the data collected from the security device into a comma-separated values (CSV) format;

a data normalization unit configured to normalize the data transformed by the format transform unit into respective individual fields based on a pre-defined divider, and to select candidate feature fields from the individual fields, wherein the individual fields and the candidate feature fields include the data normalized by the data normalization unit; and a data classification unit configured to classify the data normalized by the data normalization unit according to fields predesignated in a classification system table for classification, wherein the predesignated fields include an event type and a detection name, and to further classify the classified data into any one group of a learning group, a verification group, and a test group, to generate the standardized data set, and wherein the data pre-processing device includes:

a data processing unit configured to carry out decoding, removal of unnecessary data, and normalization of a payload from the standardized data set which includes the data normalized and classified by the data collection device;

a feature information transform unit configured to receive data from the data processing unit and, to transform a feature value in the received data which is larger than a reference value into a predetermined value, thereby adjusting data scaling;

and a natural language learning unit configured to express feature information pre-processed by the data processing unit and feature information transform unit as a vector, and to generate the learning data set, the verification data set, the test data set by causing the artificial intelligence model to study front and back words of vectorized data and text information in advance.

2. The system of claim 1, wherein the candidate feature fields comprise any one or more pieces of information among various pieces of information on time at which detection starts, an address of a starting place, an address of a destination, a port of a destination, a packing direction, a protocol, a type of an event, a name of detection, a length of a packet, labeling, and a payload.

3. The system of claim 1, wherein the abnormal-act detection device includes: an artificial intelligence model learning unit configured to carry out learning of a plurality of artificial intelligence models via the learning data set generated by the data pre-processing device, and to select and save an artificial intelligence model having the highest performance among the plurality of artificial intelligence models; an artificial intelligence model selection unit configured to select any one among the artificial intelligence models saved in the artificial intelligence model learning unit when the data threatening to the security from the security device is collected; an artificial intelligence model estimate unit configured to generate information on an estimated result by automatically judging whether the data threatening to the security is correctly detected or is wrongly detected via the artificial intelligence model selected by the artificial intelligence model selection unit, and to inform a user of information on an abnormal act threatening to the security in case that the data threatening to the security is correctly detected; and a history management unit configured to save the information on the estimated result generated by the artificial intelligence model estimate unit, and to transmit the information on the estimated result to the artificial intelligence learning unit when re-learning is performed.

4. The system of claim 3, wherein the artificial intelligence model learning unit selects and saves the artificial intelligence model having the highest performance by measuring respective AUC (Area under the ROC curve) marks of the plurality of artificial intelligence models using a Bayesian optimizer technique for optimizing hyperparameters of the artificial intelligence models.

5. A method of detecting an abnormal act threatening to security based on artificial intelligence, the method comprising:

a step A in which a data collection device collects data required for learning of artificial intelligence models from a security device, and generates a standardized data set by normalizing and classifying an event field and a format of the collected data;

a step B in which a data pre-processing device extracts feature data from the standardized data set generated by the data collection device, and generates a learning data set, a verification data set, and a test data set by rapidly carrying out data pre-processing based on multi-processing for natural language processing required for artificial intelligence learning based on a text; and a step C in which an abnormal-act detection device causes artificial intelligence models to study by receiving the data sets from the data pre-processing device, and detects an abnormal act based on data threatening to security collected from the security device, wherein the step A includes:

a step in which a format transform unit transforms the data collected from the security device into a CSV format;

a step in which a data normalization unit normalizes the data transformed by the format transform unit into respective individual fields based on a pre-defined divider, and selects candidate feature fields from the individual fields, wherein the individual fields and the candidate feature fields include the data normalized by the data normalization unit; and a step in which a data classification unit classifies the data normalized by the data normalization unit according to fields predesignated in a classification system table for classification, where the predesignated fields include an event type and a detection name, and further classifies the classified data into an one group of a learning group, a verification group, and a test group, to generate the standardized data set, and wherein the step B includes:

a step in which a data processing unit carries out decoding, removal of unnecessary data, and normalization of a payload from the standardized data set which includes the data normalized and classified by the data collection device;

a step in which a feature information transform unit receives data from the data processing unit, and transforms a feature value in the received data which is larger than a reference value into a predetermined value, thereby adjusting data scaling; and a step in which a natural language learning unit expresses feature information pre-processed by the data processing unit and the feature information transform unit as a vector, and generates the learning data set, the verification data set, the test data set by causing the artificial intelligence model to study front and back words of vectorized data and text information in advance.

6. The method of claim 5, wherein the candidate feature fields comprise any one or more pieces of information among various pieces of information on time at which detection starts, an address of a starting place, an address of a destination, a port of a destination, a packing direction, a protocol, a type of an event, the name of detection, a length of a packet, labeling, and a payload.

7. The method of claim 5, wherein the step C includes: a step in which an artificial intelligence model learning unit carries out learning of a plurality of artificial intelligence models via the learning data set generated by the data pre-processing device, and selects and saves an artificial intelligence model having the highest performance among the plurality of artificial intelligence models; a step in which an artificial intelligence model selection unit selects any one among the artificial intelligence models saved in the artificial intelligence model learning unit when the data threatening to the security is collected; a step in which an artificial intelligence model estimate unit generates information on an estimated result by automatically judging whether the data threatening to the security is correctly detected or is wrongly detected via the artificial intelligence model selected by the artificial intelligence model selection unit, and informs a user of information on an abnormal act actually threatening to the security in case that detection is correctly performed; and a step in which a history management unit saves the information on the estimated result generated by the artificial intelligence model estimate unit, and transmits the information on the estimated result to the artificial intelligence learning unit when re-learning is performed.

8. The method of claim 7, wherein the artificial intelligence model learning unit selects and saves the artificial intelligence model having the highest performance by measuring respective AUC marks of the plurality of artificial intelligence models using a Bayesian optimizer technique for optimizing hyper parameters of the artificial intelligence models.

9. The system of claim 1, wherein the data required for the learning of the artificial intelligence model includes an event log collected via a system log and a simple network management protocol (SNMP) by the data collection device.

10. The system of claim 1, wherein the security device includes at least one of an enterprise security management (ESM) system, a security information and event management (SIEM) system, an intrusion detection system (IDS), and a machine learning solution.

11. The method of claim 5, wherein the data required for the learning of the artificial intelligence model includes an event log collected via a system log and a simple network management protocol (SNMP) by the data collection device.

12. The method of claim 5, wherein the security device includes at least one of an enterprise security management (ESM) system, a security information and event management (SIEM) system, an intrusion detection system (IDS), and a machine learning solution.

* * * * *